(12) United States Patent
Tanaka

(10) Patent No.: US 8,009,912 B2
(45) Date of Patent: Aug. 30, 2011

(54) IMAGE-PROCESSING APPARATUS WHICH HAS AN IMAGE REGION DISTINCTION PROCESSING CAPABILITY, AND AN IMAGE REGION DISTINCTION PROCESSING METHOD

(75) Inventor: Hiromasa Tanaka, Izunokuni (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1009 days.

(21) Appl. No.: 11/859,913

(22) Filed: Sep. 24, 2007

(65) Prior Publication Data
US 2009/0080775 A1    Mar. 26, 2009

(51) Int. Cl.
*G06K 9/00* (2006.01)
(52) U.S. Cl. ........ 382/180; 382/195; 382/205; 382/261; 382/266; 382/270
(58) Field of Classification Search .................. 382/112, 382/162, 175–187, 195, 205, 260–266, 270, 382/274, 275
See application file for complete search history.

(56) References Cited

U.S. PATENT DOCUMENTS

| 5,937,232 A * | 8/1999 | Taguchi et al. ................. 399/81 |
| 6,965,695 B2 * | 11/2005 | Yamakawa .................... 382/199 |
| 7,199,897 B2 * | 4/2007 | Nomizu ....................... 358/1.18 |

FOREIGN PATENT DOCUMENTS

JP    10-112800    4/1998

* cited by examiner

*Primary Examiner* — Wesley Tucker
(74) *Attorney, Agent, or Firm* — Turocy & Watson, LLP

(57) ABSTRACT

In an image-processing apparatus having a capability of performing region distinction processing and an image region discrimination processing method, a first region distinction unit uses a previously set threshold value for an image region distinction to perform a region distinction processing of a character and a non-character on image data read from an original document, an edge feature amount image and a character determination signal are obtained, a second region distinction unit makes a region distinction on the edge feature amount image based on the threshold value and generates and displays sub-region images obtained by dividing the edge feature amount image into plural parts, a character discrimination strength adjustment is performed on a display screen while each of the sub-region images is visually identified, the correction parameter is reflected in the edge feature amount image, and the region distinction processing is performed again.

9 Claims, 4 Drawing Sheets

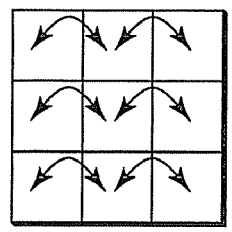
Lateral direction edge feature amount calculation
F I G. 2A
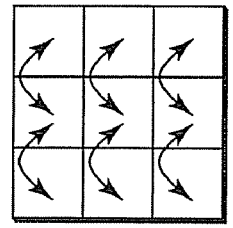
Longitudinal direction edge feature amount calculation
F I G. 2B
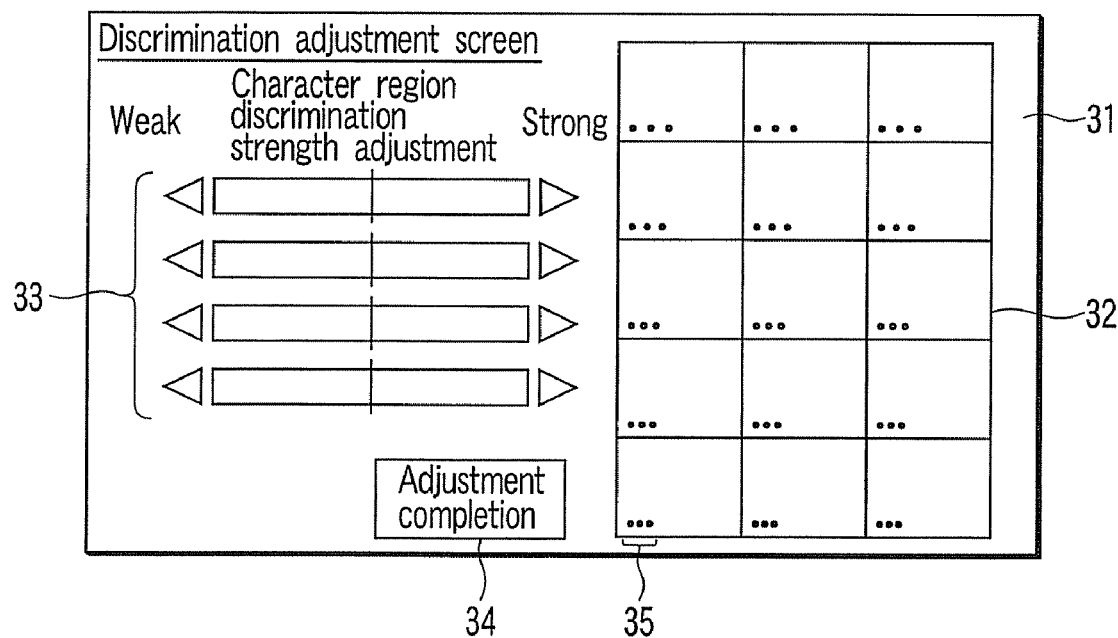
F I G. 3

IMAGE-PROCESSING APPARATUS WHICH HAS AN IMAGE REGION DISTINCTION PROCESSING CAPABILITY, AND AN IMAGE REGION DISTINCTION PROCESSING METHOD

BACKGROUND OF THE INVENTION

1. Field of the Invention

The present invention relates to an image-processing apparatus which has an image region distinction processing capability to perform an image processing according to a type of image data, and an image region distinction processing method.

2. Description of the Related Art

In general, in an image processing apparatus, for example, in a digital copier, various methods are used in order to improve picture quality when an image signal read from an original document by an image sensor is printed and outputted to a recording sheet. As one method of improving the picture quality, a character region, a dot region and the like contained in information described on an original document are respectively classified, and an image processing corresponding to the characteristic of an image of each of the regions is performed to realize high-quality print output. In this image processing, for example, with respect to the dot region, such as a photograph, in the information classified on the original document, a smoothening processing is performed in order to suppress a moire, and with respect to the character region, an emphasis processing is performed in order to emphasize the contour of a character. At this time, when a region distinction for classification based on each image type is erroneously made, the smoothening processing is performed on the character region, and the contour emphasis processing is performed on the dot region, and accordingly, the opposite effect occurs. Accordingly, the image region distinction has a very important role in order to improve the picture quality.

As an image region distinction method, for example, JP-A-10-112800 proposes a method of distinguishing a dot region in a mixed image of characters, dots and the like. A density difference (edge feature amount) between a marked pixel and an adjacent pixel is calculated for each marked pixel, and it is primarily determined from the density difference whether the density of the marked pixel is a peak value or not. In addition, the number of peak values in region pixels is calculated, and in the case where at least one peak value exists, the region is made a dot candidate. Next, the number of similar dot candidates of peak values existing in a specified number of pixels is calculated. It is determined whether the ratio of the dot candidates existing in the previously determined number of pixels is 90 percent or more. Further, the continuity of the dot region is determined, a discrimination is made between dot detection of 100 lines or less close to a character and thin dot detection of 100 lines or more, and an image reproduction processing according to the fineness of the dot part is performed.

As stated above, according to whether the number of pixels having the density difference exceeds a previously determined threshold value or not, a distinction is made between a character and a non-character (photograph, picture pattern, etc.). However, in an actual distinction, an obtained image signal is different from a true image signal by various factors, such as reading performance of a scanner and disturbance such as vibration, and accordingly, a complete image region distinction is very difficult, an accurate distinction can not be made, and an erroneous discrimination occurs between the character region and the dot region. Besides, in a general region distinction processing, although a distinction is made based on a previously set fixed threshold value (parameter), it is difficult to perform a high-precision distinction processing on images of various forms.

BRIEF SUMMARY OF THE INVENTION

Then, an image-processing apparatus having an image region distinction processing capability includes an image data generation unit configured to generate image data from information read from an original document, a first region distinction unit configured to generate a character determination signal and edge feature amount image data by a region distinction between a character and a non-character using a previously set threshold value on the image data, a second region distinction unit configured to make the region distinction between the character and the non-character on the edge feature amount image data from the first region distinction unit to divide it into plural sub-region images and to display them, to adjust discrimination strength of each of the sub-region images, and to obtain a correction parameter according to the adjustment, an image processing control unit configured to cause the correction parameter to be reflected in the image region distinction of the first region distinction unit and to cause the region distinction processing to be performed again, and an image correction processing unit configured to image correct the image data based on the edge feature amount image data subjected to the region distinction processing again, whereby the adjustment of the discrimination strength is not fixed, the adjustment of discrimination according to the original document is performed by a suitable operation, and the deterioration of picture quality by erroneous discrimination is suppressed.

Further, an image region distinction processing method of an image-processing apparatus includes an image data generation step of generating first image data from information read from an original document, a first region distinction processing step of generating a character determination signal and edge feature amount image data by making a distinction between a character and a non-character based on a previously set threshold value on the first image data generated by the image data generation step, a step of making a distinction between a character and a non-character based on the threshold value on the edge feature amount image data, and generating and displaying sub-region images obtained by division into plural parts according to a distinction result and an adjustment bar for discrimination strengths of the sub-region images, a correction parameter acquisition step of making a discrimination strength adjustment by the adjustment bar and acquiring a correction parameter of the edge feature amount image data by adjustment, a second region distinction processing step of causing the correction parameter to be reflected in the distinction between the character and the non-character on second image data generated from information re-read from the original document by the image data generation step and making the distinction, and an output step of performing an image correction different for each type of distinction image regions of the character and the non-character distinguished by the second region distinction processing step and making an output.

BRIEF DESCRIPTION OF THE SEVERAL VIEWS OF THE DRAWINGS

FIG. 2A is a view for explaining lateral direction edge feature amount calculation to calculate an edge feature amount between a marked pixel and an adjacent pixel in a lateral direction, and FIG. 2B is a view for explaining lateral direction edge feature amount calculation to calculate an edge feature amount between a marked pixel and an adjacent pixel in a longitudinal lateral direction.

FIG. 3 is a view showing a display example of a discrimination strength adjustment screen.

DETAILED DESCRIPTION OF THE PREFERRED EMBODIMENT

Hereinafter, embodiments of the invention will be described in detail with reference to the drawings.

Figure 1:
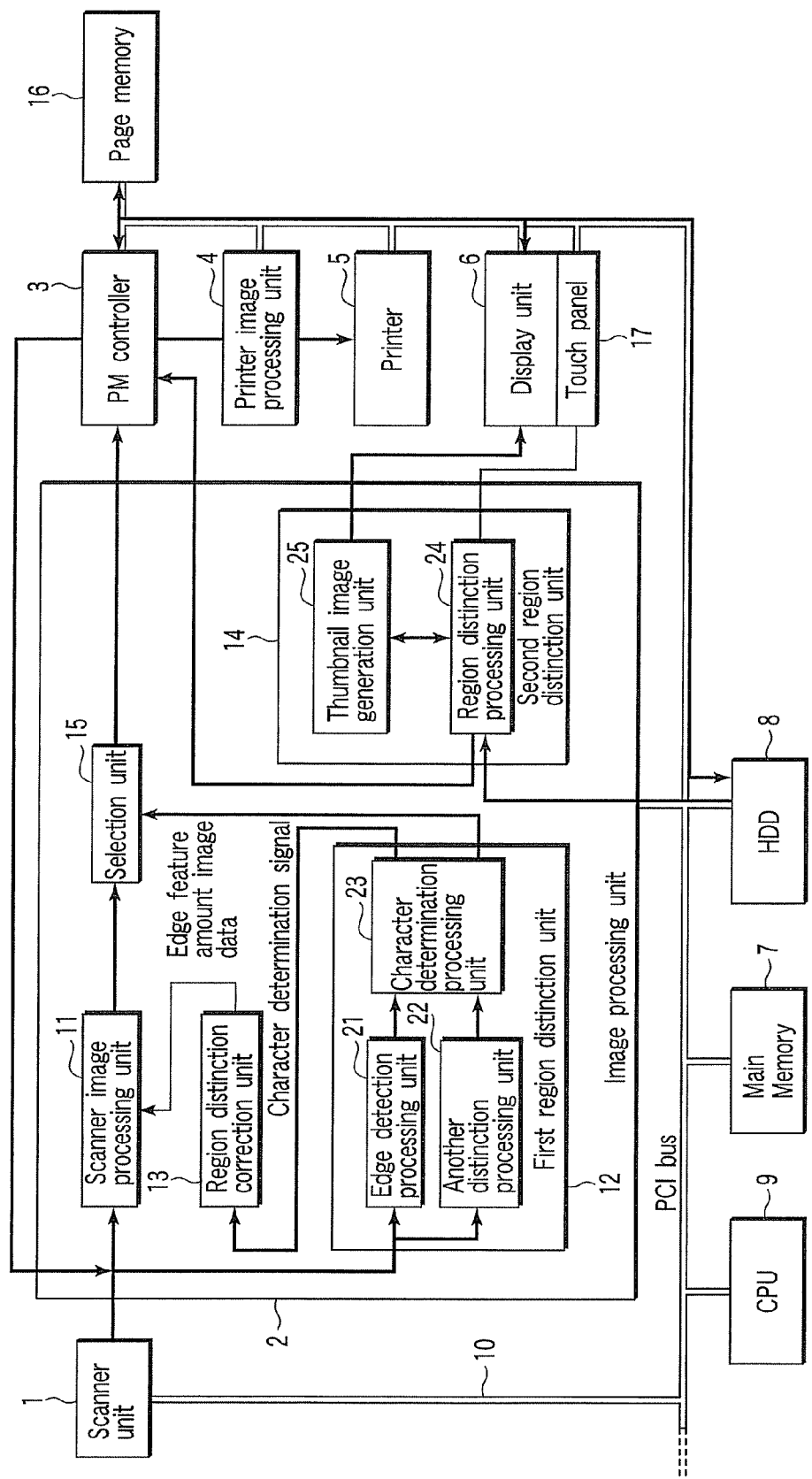
FIG. 1 is a view showing a structural example of an image-processing apparatus having an image region distinction processing capability according to a first embodiment.

FIG. 1 is a view showing a structural example of an image-processing apparatus having an image region distinction processing capability of an embodiment.

The invention relates to an image-processing apparatus having a capability in which a region distinction processing of a character and a non-character is performed by using a previously set threshold value (fixed value) for image region distinction, plural divided images (for example, sub-region images) are displayed from the result, a user sets and adjusts character discrimination strength adjustment on a display screen while seeing these images, the adjustment value (correction parameter) is reflected in an edge feature amount, and the region distinction processing is performed again.

The image-processing apparatus includes a scanner unit 1 to read information from an original document and to generate image data, an image processing unit 2 that has a discrimination strength adjustment capability, distinguishes an image region and performs an image processing, a PM controller 3 to control the image processing and print output, a printer image processing unit 4 to perform the image processing for each type of distinction regions, a printer 5 to perform the print output, a display unit 6 made of a liquid crystal display or the like in which a touch panel is disposed on its surface, a main memory 7 to store a program relating to the image processing and a threshold value (fixed value) for character (or photograph) distinction, a hard disk (HDD) 8 to store image data and the like, and an image processing control unit (central processing unit: CPU) 9 to control the whole image-processing apparatus. The respective component parts are coupled through a PCI bus 10, and an exchange of control signals and image data can be performed. In the drawing, a thick line arrow indicates a flow of image data. In order to improve picture quality at the time of print output, the printer image processing unit 4 performs an image processing, such as expansion of a compressed image signal, gamma correction or gradation processing, on an image distinction region image distinguished for each type of a character, a photograph and the like.

The PM controller 3 includes a selection unit to select a mode with correction capability in which the discrimination strength adjustment capability of the embodiment is performed by an instruction of an operator, and a normal mode.

The image processing unit 2 includes a scanner image processing unit 11, a first region distinction unit 12, a region determination correction unit 13, a second region distinction unit 14 and a selection unit 15.

The first region distinction unit 12 includes an edge detection processing unit 21 to calculate an edge feature amount signal of image data, another well-known distinction processing unit 22, and a character determination processing unit 23 to output an edge feature amount image signal (or edge feature amount image data) including an edge feature amount and image data and a character determination signal from these processing signals. Here, the character determination signal is a discrimination signal to discriminate between a character region and a non-character (photograph or picture pattern) region in an image. The edge feature amount image data includes lateral direction edge feature amount calculation to calculate a density difference (edge feature amount) between a marked pixel and an adjacent pixel in a lateral direction (column direction) as shown in FIG. 2A and longitudinal direction edge feature amount calculation to calculate a density difference between a marked pixel and an adjacent pixel in a longitudinal lateral direction (row direction) as shown in FIG. 2B. The character determination processing unit 23 uses a previously set threshold value (fixed value) for making a distinction between a character and a non-character read from the main memory 7 and makes a character determination.

Besides, the second region distinction unit 14 includes a region distinction processing unit 24 to make a determination of a character and a non-character on the edge feature amount image data by using the same threshold value as the threshold value for character determination of the character determination processing unit 23 and to make an image region distinction, and a sub-region image generation unit 25 to generate plural divided sub-region images from the edge feature amount image data by using distinction results. With respect to the sub-region images, the edge feature amount image data may be divided by each image type (character, non-character) or may be divided into plural parts by a previously determined division number or size.

These component parts will be described in detail.

In the scanner unit 1, illumination light for reading is irradiated to an original document from a light source, reflected light from the original document is focused by an objective lens, and an image sensor (for example, a CCD image sensor, a CMOS image sensor, etc.) performs photoelectric conversion to generate an image signal. Further, a digitizing processing is performed on the image signal by A/D conversion and image data is generated. The generated image data is outputted to the scanner image processing unit 11 and the first region distinction unit 12.

In the scanner image processing unit 11, color conversion, filter processing, image compression and the like are suitably performed on the inputted image data. Further, in the scanner image processing unit 11, based on the discrimination signal of the character region and the dot region (photograph, picture pattern region) in the image generated by the region distinction processing of the first region determination unit 12, switching is performed between processings corresponding to the respective regions for improving the picture quality.

Next, in the first region distinction unit 12, the character determination signal to indicate region distinction by a normal character and non-character is outputted from the character determination processing unit 23 to the region determination correction unit 13, and the edge feature amount image data is outputted to the selection unit 15. The edge feature amount image data is stored in the HDD 8 in a non-compression state. The bus width of the character determination signal in this embodiment is an output signal (four colors×1 bit) made of a distinction result (1 bit [0,1] for the character and non-character) for four colors (C, M, Y, K). Besides, the bus width of the edge feature amount/image data is an output signal of four colors×8 bits. Accordingly, the character determination signal and the edge feature amount/image data outputted by the character determination processing unit 23 require four colors×(8 bits+1 bit)=36 bits.

For example, in the case where the size of an original document is A4 (substantially 7000 pixels×9000 pixels), in order to store the non-compression edge feature amount image data, the storage capacity required in the HDD 8 per one original document is 7000 pixels×9000 pixels×4 colors×8 bits☐240 MB. Of course, no limitation is made to these, and the form of the output signal such as the bus width can be suitably and easily changed by the design or specifications, and it is assumed that the HDD 8 has a sufficient storage capacity for storing these. A region distinction result signal based on coordinate information of after-mentioned sub-regions from the character determination processing unit 23 of the second region distinction unit 14 is inputted as a corrected character determination signal to the region determination correction unit 13 through the first region distinction unit 12. The region determination correction unit 13 uses the corrected character distinction signal to calculate an adjustment value obtained by correcting a previously set threshold value (fixed value) for making a distinction between a character and a non-character read from the main memory 7, and outputs it to the scanner image processing unit 11.

Next, the second region distinction unit 14 will be described. As described before, the second region distinction unit 14 includes the region distinction processing unit 24 and the sub-region image generation unit 25.

The region distinction processing unit 24 reads the edge feature amount image data stored in the HDD 8, uses the same threshold value as the threshold value for character determination of the character determination processing unit 23 to make a determination of a character and a non-character and to make a character region distinction, and outputs the distinction result to the sub-region image generation unit 25. The sub-region image generation unit 25 uses the region distinction result to generate a discrimination strength adjustment screen as shown in FIG. 3, and causes the display unit 6 to display.

On the discrimination strength adjustment screen 31 shown in FIG. 3, a sub-region image display 32 including plural sub-regions obtained by dividing the region distinction result, an adjustment bar display 33 provided for at least each color in order to adjust the discrimination strength of the character region, and an adjustment completion button 34 for instructing a start of output after completion of adjustment.

The adjustment bar display 33 is provided for each color, and in this embodiment, four bars for four colors (C, M, Y, K) are displayed. The center of the adjustment bar display 33 is made a default value, and arrow displays 33a and 33b provided at both ends are touch operated by a finger or are instructed by a key operation of a not-shown switch panel, so that the degree of discrimination strength is set with reference to the default value. Each time the adjustment bar display 33 is changed, the distinction result is displayed as the change of the image and the update of a correction value 35 in the relevant region of the sub-region image display 32.

The correction value 35 to be adjusted by this adjustment bar display 33 is a magnification value to the edge feature amount. For example, in the case where "+1" is set by the adjustment bar display 33, when the magnification value corresponding to "+1" is L3, pixel values in the edge feature amount image data stored in the HDD 8 are respectively magnified by 1.3, and the character determination using the threshold value is performed by the second region distinction unit 14. That is, the edge feature amount is adjusted, and the threshold value used for the character distinction is made fixed. Besides, in the adjustment bar display 33, when the discrimination strength is changed, the region distinction result adjusted based on the adjustment content is updated at any time, and is displayed on the display screen of the display unit 6.

Further, in the sub-region image display 32, when the operator touches a classification position (line classifying the regions) of the sub-region of the display screen, the line can be shifted. Accordingly, for example, in the case where a region is classified as a dot distinction region (photographic region) although it is actually a character distinction region, the line is shifted, so that the distinction region can be corrected.

The user adjusts the discrimination strength based on the display state, and when determining that the adjustment is completed, the user touches the adjustment completion button 34, so that the correction value (correction parameter) obtained by the adjustment is outputted to the first region distinction unit 12. In the case where the correction value is not immediately used because of the processing sequence, it may be stored as the correction parameter into a memory such as the main memory and may be suitably read and used as the need arises. In order to realize the embodiment, a contrivance to enable forcible update is provided so that the determination result based on the coordinate information of the sub-regions by the second region distinction unit 14 is reflected in the determination result of the first region distinction unit 12.

In the first region distinction unit 12, this correction value is reflected in the original edge feature amount. The region distinction is made again based on the corrected edge feature amount, and the result is sent to the printer image processing unit 4 through the selection unit 15. In the printer image processing unit 4, the image processing is performed for each type of the corrected region distinction region, and print output is performed by the printer 5.

Figure 4:
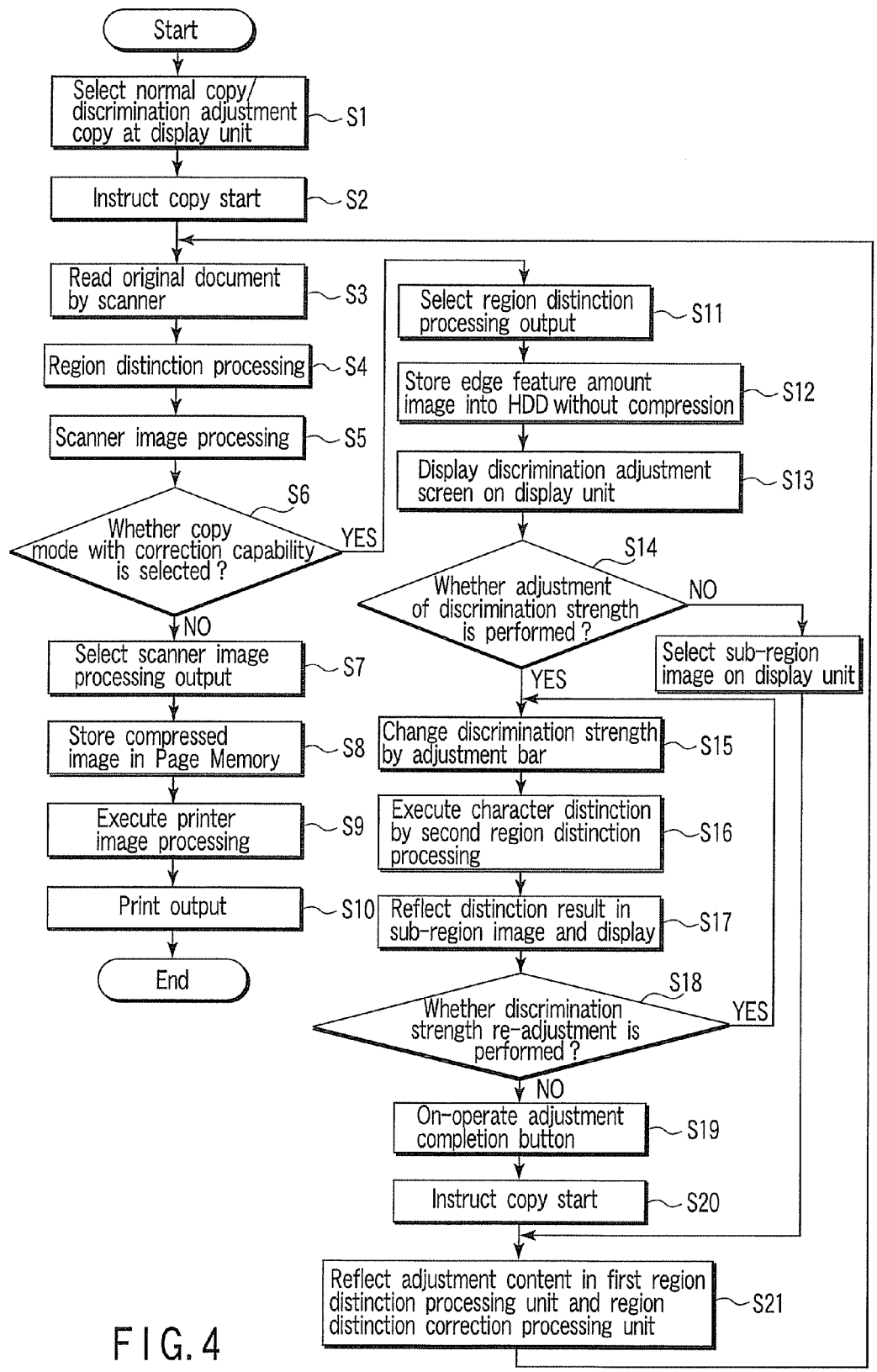
FIG. 4 is a flowchart for explaining an operation of an image-processing apparatus having a discrimination strength adjustment capability of the first embodiment.

Next, the operation of the image-processing apparatus having the discrimination strength adjustment capability of the embodiment will be described with reference to the flowchart shown in FIG. 4. Here, in order to specifically explain the operation, a digital copier is used as an example of the image-processing apparatus, and the description will be made.

In this embodiment, by a selection unit incorporated in the PC controller 3, it is possible to select a copy mode with correction capability in which the discrimination strength adjustment capability is performed and a normal copy mode. These copy modes are both high quality copies in which the region distinction processing of the character and non-character is performed, and a high quality processing of an image suitable for the type is performed. Of course, the normal copy mode may be such that the region distinction is not performed, and only a related art high quality processing is performed.

First, the operator selects the normal copy or the copy with the correction capability by the operation panel provided in the image-processing apparatus or the touch panel of the display unit 6 (step S1). At the time of the selection, various normal settings of copy size, the number of prints, single-sided or double-sided copy, and the like are performed.

Next, a copy start button on the operation panel or the touch panel of the display unit 6 is operated to instruct the start of a copy operation (step S2). In accordance with the instruction of the copy start, information is read from an original document by the scanner unit 1 and image data is generated (step S3). Incidentally, in the case where the copy with the correction capability is selected at step S2, the information reading operation becomes [pre-scan: (previous information reading)]. This image data is outputted to the scanner image processing unit 11 and the first region distinction unit 12.

By the first region distinction unit 12, a character distinction region and a dot distinction region, that is, a character determination signal and edge feature amount/image data are generated from the image data (step S4). At this time, in the scanner image processing unit 11, color conversion, filter processing, image compression and the like are suitably performed on the image data (step S5). Besides, in the scanner image processing unit 11, based on the character determination signal generated by the region distinction processing of the first region determination unit 12, switching is performed between processings corresponding to the character distinction region and the dot distinction region.

Next, it is determined whether the copy with the correction capability is selected before the copy start (step S6). In this determination, when the copy with the correction capability is not selected (NO), it is determined that the normal copy is selected. In the processing of the normal copy, the selection unit 15 selects the image data which is outputted from the scanner image processing unit 11 and has been subjected to the region distinction, and outputs it to the PM controller 3 (step S7). The PM controller 3 stores the image data which has been subjected to the region distinction into the page memory 16 (step S8).

Next, the image data subjected to the region distinction is read from the page memory 16 to the printer image processing unit 4, the image correction processing corresponding to the character distinction region and the dot distinction region is performed in the printer image processing unit 4 (step S9), print output is performed from the printer 5 (step S10), and the series of sequence is ended.

On the other hand, in the case where the copy with the correction capability is selected in the determination of step S6 (YES), the selection unit 15 selects the edge feature amount data outputted by the first region distinction unit 12 (step S11), and it is stored in the HDD 8 in a non-compression state (step S12). That is, the image data by the printer image processing unit 4 is not stored in the page memory 16.

Next, as described above, the second region distinction unit 14 reads the edge feature amount image data stored in the HDD 8, makes the character region distinction using the same threshold value as the threshold value in the character determination processing unit 23, generates an adjusting screen (sub-region image) based on the distinction result, and cause the display unit 6 to display (step S13).

The user sees the sub-region image displayed on the display unit 6, and determines whether adjustment of discrimination strength is performed (step S14). In the case where the adjustment of the discrimination strength is performed in this determination (YES), the adjustment bar display 33 is operated to change the degree of the discrimination strength (step S15). The edge feature amount is corrected in accordance with the change of the discrimination strength by the operation of the adjustment bar display 33, and the character region distinction is performed again by the region distinction processing unit 24 (step S16). The distinction result based on the corrected edge feature amount is reflected in the sub-region image and is displayed (step S17).

The operator visually identifies the sub-region image, and determines whether re-adjustment of the discrimination strength is performed (step S18). In this determination, in the case where the adjustment is performed again (YES), return is made to step S15, and the operation of the adjustment bar display 33 is performed. On the other hand, in the case where it is determined that the re-adjustment of the discrimination strength is completed (NO), the adjustment completion button of the discrimination strength on the screen is on operated (step S19). Thereafter, the copy start button (not shown) is displayed on a next screen, and the operator performs an on operation to instruct the copy start (step S20).

By the instruction of the copy start, the correction parameter (correction value to the original edge feature amount) obtained by the adjustment of the second region distinction unit 14 is sent to the first region distinction unit 12 and the region determination correction unit 13, and is reflected in the original edge feature amount (step S21). After this reflection is completed, return is made to step 3, and the scanner unit 1 reads information from the original document and generates image data [scan]. Hereinafter, in accordance with the normal copy operation at steps S7 to S10, print output is performed and is ended.

Besides, in the determination of step S15, the operator sees the sub-region image, and in the case where the adjustment of the discrimination strength is not performed (NO), the adjustment completion button of the discrimination strength on the screen is on operated (step S22). By this on operation, a shift is made to step S21, and after the correction parameter is reflected as described before, print output is performed in accordance with the normal copy operation and is ended.

According to the embodiment described above, the region distinction between the character and the non-character is made using the image data generated by pre-scanning, the discrimination adjustment screen is displayed in which the extracted edge feature amount image data is made the plural sub-regions, and the adjustment value of each region distinction can be adjusted for each color (four colors of CMYK) by the discrimination strength adjustment bar with respect to the degree of the discrimination strength. The correction parameter obtained by this adjustment is reflected in the parameter of the region distinction processing unit. Accordingly, since the adjustment of the discrimination strength can be performed by the user operation, the adjustment of discrimination according to the original document becomes possible, and the deterioration of picture quality due to the erroneous discrimination can be suppressed by the user operation. The high precision distinction processing can be realized for any original documents by using the image region distinction processing capability.

Figure 5:
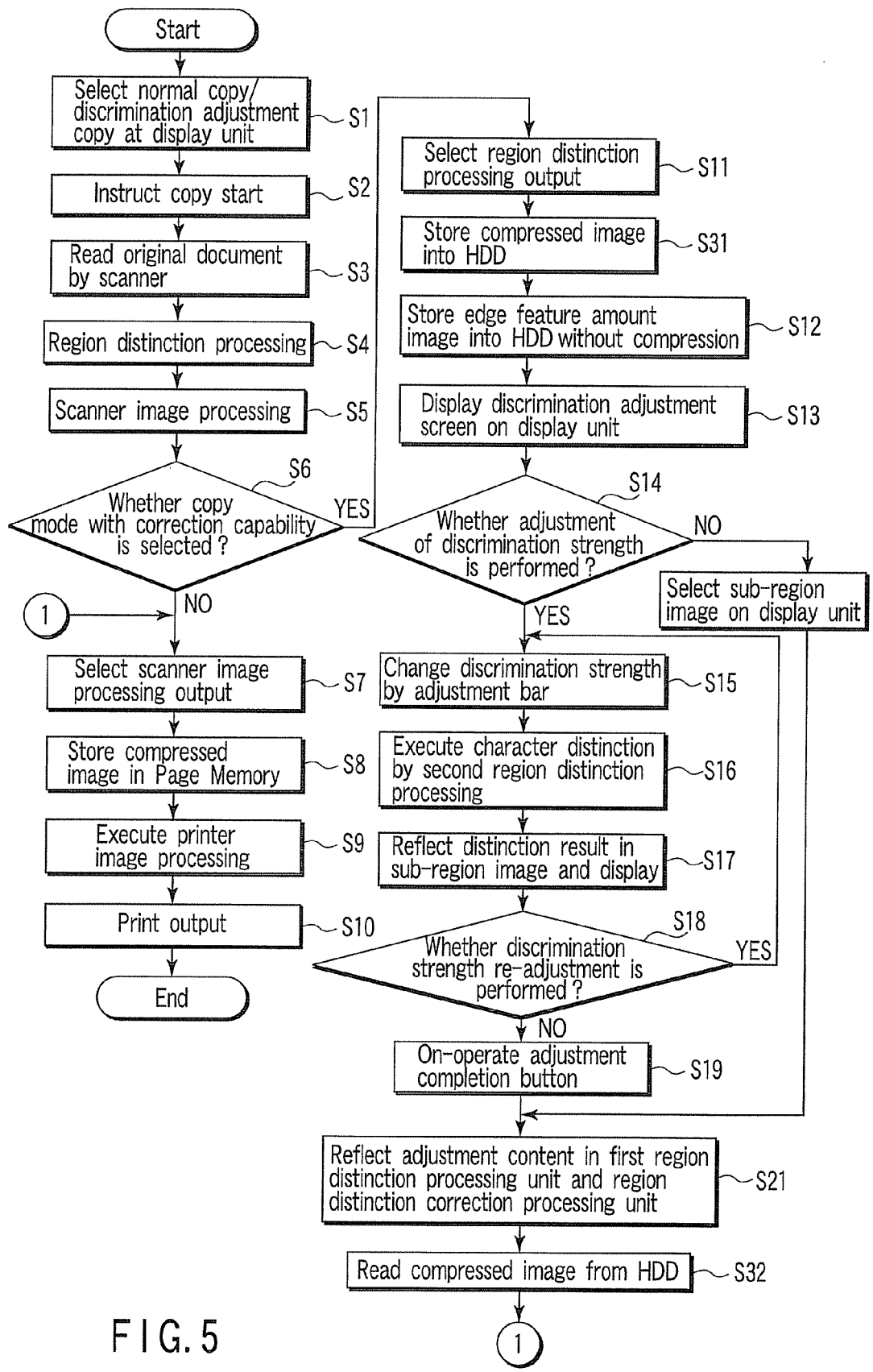
FIG. 5 is a flowchart for explaining an operation of an image-processing apparatus having a discrimination strength adjustment capability of a second embodiment.

Next, a second embodiment will be described with reference to a flowchart shown in FIG. 5.

In the foregoing first embodiment, the information reading from the original document is performed twice by pre-scanning and scanning. According to the form of information described on an original document, there is a case where even if pre-scanning is not performed, region determination is performed relatively suitably, and the adjustment of discrimination strength is small. In such a case, it is desired that the correction processing is performed in a short time and print output is performed. Since this embodiment has the same structure as that of the first embodiment shown in FIG. 1, the description of the structure will be omitted. Besides, in the flowchart of FIG. 5, the same step as that of FIG. 4 is denoted by the same S number, and its detailed description will be omitted.

First, the operator selects normal copy or copy with correction capability, operates a copy start button to perform a copy operation, and generates image data (steps S1 to S3). Next, a character determination signal and edge feature amount/image data are generated by a first region distinction unit 12, and an image processing is performed on the image data in a scanner image processing unit 11 (steps S4 and S5).

Next, it is determined whether the copy with the correction capability is selected before a copy start, and in the case where the normal copy is selected, a selection unit 15 selects the image data which is outputted from the scanner image processing unit 11 and has been subjected to region distinction, and once stores it into a page memory 16. Next, in a printer image processing unit 4, an image correction processing corresponding to a character distinction region and a dot distinction region is performed, and print output is performed from a printer 5 (steps S7 to S10).

On the other hand, in the case where the copy with the correction capability is selected in the determination at step S6 (YES), the selection unit 15 selects the image data outputted from the scanner image processing unit 11, and stores it into the HDD 8 (step S31). Further, the selection unit 15 selects edge feature amount image data outputted by the first region distinction unit 12 (step S11), and stores it into the HDD 8 in a non-compression state (step S12). That is, the image data by the printer image processing unit 4 is once stored.

Next, as described before, a second region distinction unit 14 reads the edge feature amount image data stored in the HDD 8, uses the same threshold value as the threshold value in the character determination processing unit 23 to make a character region distinction, generates an adjusting screen (sub-region image) based on the distinction result, and causes a display unit 6 to display (step S13).

The user sees the sub-region image displayed on the display unit 6, and determines whether adjustment of discrimination strength is performed (step S14). At this determination, in the case where the adjustment of the discrimination strength is performed (YES), an adjustment bar display 33 is operated, and the degree of the discrimination strength is changed (step S15). The edge feature amount is corrected in accordance with the change of the discrimination strength by the operation of the adjustment bar display 33, and the character region distinction is made again by the region distinction processing unit 24 (step S16). The distinction result based on the corrected edge feature amount is reflected in the sub-region image and is displayed (step S17).

The operator visually identifies the sub-region image, and determines whether re-adjustment of the discrimination strength is performed (step S18). In this determination, in the case where the adjustment is performed again (YES), return is made to step S15, and the adjustment bar display 33 is operated. On the other hand, when it is determined that the re-adjustment of the discrimination strength is completed (NO), an adjustment completion button of discrimination strength on the screen is on operated (step S19). Thereafter, the correction parameter (correction value to the original edge feature amount) obtained by the adjustment of the second region distinction unit 14 is sent to the first region distinction unit 12 and the region determination correction unit 13, and is reflected in the original edge feature amount (step S21).

Next, the image data outputted from the scanner image processing unit 11 and stored at step S31 in the HDD 8 is read (step S32), and a shift is made to step S7. Hereinafter, in accordance with the normal copy operation of steps S7 to S10, print output is performed and is ended. Besides, in the determination of step S15, in the case where the sub-region image is seen and the adjustment of the discrimination strength is not performed (NO), the adjustment of the discrimination strength is completed (step S22), and a shift is made to step S21, and after the correction parameter is reflected as described before, print output is performed in accordance with the normal copy operation and is ended.

According to this embodiment, in addition to the effect of the first embodiment, although the memory capacity to store the image data (compressed data) of the read original document is required, the reading operation of the original document has only to be performed once, and the time from reading to print output in copy can be shortened.

From the above, the region distinction result is displayed as the image on the display screen, and while the image is visually identified, the adjustment of discrimination strength can be performed. The region distinction result image displayed on the display screen is divided into plural sub-regions, and the panel is touched, so that the distinction result of the selected region can be forcibly changed. Further, the image having the edge feature amount as the pixel value is stored in the HDD, so that the distinction result can be displayed again without re-scanning the reflection result of the discrimination strength changed on the display screen.

What is claimed is:

1. An image-processing apparatus having an image region distinction processing capability, comprising:
    an image data generation unit configured to generate image data from information read from an original document;
    a first region distinction unit configured to generate a character determination signal and edge feature amount image data by a region distinction between a character and a non-character using a previously set threshold value on the image data;
    a second region distinction unit configured to make the region distinction between the character and the non-character on the edge feature amount image data from the first region distinction unit to divide it into plural sub-region images and to display them, to adjust discrimination strength of each of the sub-region images, and to obtain a correction parameter according to the adjustment;
    an image processing control unit configured to cause the correction parameter to be reflected in the image region distinction of the first region distinction unit and to cause the region distinction processing to be performed again; and
    an image correction processing unit configured to image correct the image data based on the edge feature amount image data subjected again to the region distinction processing.

2. The image-processing apparatus according to claim 1, wherein when the correction parameter is reflected in the image region distinction of the first region distinction unit, the image processing control unit causes the region distinction processing to be performed on image data generated by the image data generation unit through re-reading the original document.

3. The image-processing apparatus according to claim 1, further comprising a storage unit configured to store the image data generated by the image data generation unit,
    wherein when the correction parameter is reflected in the image region distinction of the first region distinction unit, the image processing control unit causes the region distinction processing to be performed on the image data read from the storage unit.

4. The image-processing apparatus according to claim 1, wherein the second region distinction unit includes
    a region distinction processing unit configured to make a distinction between a character and a non-character on the edge feature amount image data by using the threshold value in the first region distinction unit, and
    a sub-region image generation unit configured to generate the sub-region images by dividing the edge feature amount image data into a plurality of parts according to a determination result of the region distinction processing unit with respect to the edge feature amount image data, to display an adjustment bar to adjust discrimination strength of each of the sub-region images, to change a degree of the strength of the adjustment bar, and to obtain a correction parameter according to the change.

5. The image-processing apparatus according to claim 1, wherein the sub-region images in the sub-region image generation unit are either the sub-region images obtained by division into a plurality of parts based on a character region and a non-character region according to a distinction result of the region distinction processing unit or the sub-region images obtained by division into a plurality of parts based on a previously determined division number.

6. The image-processing apparatus according to claim 1, wherein the image processing control unit includes a selection unit configured to perform one of
   a mode with a correction capability to perform discrimination strength adjustment using the first region distinction unit and the second region distinction unit, and
   a normal mode to make the region distinction between the character and the non-character using a previously set fixed threshold value.

7. The image-processing apparatus according to claim 1, wherein a data amount of the character determination signal and the edge feature amount image data outputted by the first region distinction unit is a sum of a bus width of the character determination signal, which is an output signal obtained by multiplying 1 bit for the character and non-character by the number of colors, and a bus width of the edge feature amount image data, which is an output signal obtained by multiplying the number of colors by 8 bits.

8. An image region distinction processing method of an image-processing apparatus, comprising:
   an image data generation step of generating first image data from information read from an original document;
   a first region distinction processing step of generating a character determination signal and edge feature amount image data by making a distinction between a character and a non-character based on a previously set threshold value on the first image data generated by the image data generation step;
   a step of making a distinction between a character and a non-character based on the threshold value on the edge feature amount image data, and generating and displaying sub-region images obtained by division into a plurality of parts according to a distinction result and an adjustment bar for discrimination strengths of the sub-region images;
   a correction parameter acquisition step of making a discrimination strength adjustment by the adjustment bar and acquiring a correction parameter of the edge feature amount image data by adjustment;
   a second region distinction processing step of causing the correction parameter to be reflected in the distinction between the character and the non-character on second image data generated from information re-read from the original document by the image data generation step and making the distinction; and
   an output step of performing an image correction different for each type of distinction image regions of the character and the non-character distinguished by the second region distinction processing step and making an output.

9. An image region distinction processing method of an image-processing apparatus, comprising:
   an image data generation step of generating first image data from information read from an original document;
   an image storage step of storing the first image data;
   a first region distinction processing step of generating a character determination signal and edge feature amount image data by making a distinction between a character and a non-character based on a previously set threshold value on the first image data;
   a step of making a distinction between a character and a non-character based on the threshold value on the edge feature amount image data, and generating and displaying sub-region images obtained by division into a plurality of parts according to a distinction result and an adjustment bar for discrimination strengths of the sub-region images;
   a correction parameter acquisition step of making a discrimination strength adjustment by the adjustment bar and acquiring a correction parameter of the edge feature amount image data by adjustment;
   read again from the original document by the image data generation step
   a second region distinction processing step of reading the first image data stored at the image storage step, causing the correction parameter to be reflected in the distinction between the character and the non-character on the first image data and making the distinction; and
   an output step of performing an image correction different for each type of distinction image regions of the character and the non-character distinguished by the second region distinction processing step and making an output.

* * * * *